United States Patent
Fish

(12)
(10) Patent No.: US 6,195,652 B1
(45) Date of Patent: *Feb. 27, 2001

(54) SELF-EVOLVING DATABASE AND METHOD OF USING SAME

(76) Inventor: Robert D. Fish, 3000 S. Augusta Ct., La Habra, CA (US) 90631

( * ) Notice: Subject to any disclaimer, the term of this patent is extended or adjusted under 35 U.S.C. 154(b) by 0 days.

This patent is subject to a terminal disclaimer.

(21) Appl. No.: 09/431,031

(22) Filed: Oct. 28, 1999

Related U.S. Application Data

(63) Continuation-in-part of application No. 09/128,116, filed on Jul. 3, 1998, now Pat. No. 6,035,294.
(60) Provisional application No. 60/123,019, filed on Mar. 4, 1999.

(51) Int. Cl.[7] ................................................ G06F 17/30
(52) U.S. Cl. .................................. 707/2; 707/102
(58) Field of Search ........................ 707/2, 102

(56) References Cited

U.S. PATENT DOCUMENTS

| | | | | |
|---|---|---|---|---|
| 5,329,612 | * | 7/1994 | Kakazu et al. | 706/59 |
| 5,523,942 | * | 6/1996 | Tyler et al. | 705/4 |
| 5,594,638 | * | 1/1997 | Iliff | 705/3 |
| 5,694,546 | * | 12/1997 | Reisman | 705/26 |
| 5,727,164 | * | 3/1998 | Kay et al. | 705/28 |
| 5,787,283 | * | 7/1998 | Chin et al. | 717/1 |
| 5,799,151 | * | 8/1998 | Hoffer | 709/201 |
| 5,870,746 | * | 2/1999 | Knutson et al. | 707/101 |
| 5,889,799 | * | 3/1999 | Grossman et al. | 379/266 |
| 5,924,090 | * | 7/1999 | Krellenstein | 707/5 |
| 5,999,179 | * | 12/1999 | Kekic et al. | 345/349 |
| 5,999,908 | * | 12/1999 | Abelow | 705/1 |
| 6,014,665 | * | 7/1999 | Culliss | 707/5 |
| 6,032,145 | * | 2/2000 | Beall et al. | 707/5 |
| 6,035,294 | * | 3/2000 | Fish | 707/2 |

OTHER PUBLICATIONS

Quattro P RO Getting Started, Borland International, 1990, pp. 80–81 Jn. 1990.*

* cited by examiner

*Primary Examiner*—Wayne Amsbury
(74) *Attorney, Agent, or Firm*—Fish & Associates, LLP; Robert D. Fish

(57) ABSTRACT

Self-evolving indexing systems and methods store and retrieve information on multiple types of items. Indices evolve at least in part by providing subsequent users with summary comparison usage information based upon the choices of previous users, and in part by permitting subsequent users to can add new add classifications, parameters, and values instead of being limited by those previously used by others. Summary comparison usage information is preferably communicated to users in the form of listings in which the choices are presented in order of descending usage. Contemplated systems and methods can be used to describe every conceivable type of product and service, as well as such diverse types of information as news items, historical facts, book reviews, questionnaires, opinion surveys, case law, and the topics discussed in various chat rooms. Preferred database structures include those having multiple tables for item classifications, parameters, values, and parameter-value pairs. It is especially contemplated that parameters and values can be cross-utilized across with respect to many different types of items.

12 Claims, 13 Drawing Sheets

PROMETHEUS
Classification Index

ENTER ITEM DESCRIPTION: Sport Utility Vehicles

| | MAJOR CLASS | MINOR CLASS | ITEM | FREQ |
|---|---|---|---|---|
| | Automobiles | | | |

| | MAJOR CLASS | MINOR CLASS | ITEM | FREQ |
|---|---|---|---|---|
| √ | Automobiles | Used Vehicles | Sport Utility Vehicles | 99 |
| | Automobiles | Sport Utility Vehicles | Jeeps | 2 |
| | Automobiles | Sport Utility Vehicles | Montero | 1 |
| | | | | |
| * | | | | |

GO TO: MAIN - GEO INDEX - ITEM DETAIL - VENDORS

*FIG. 3B*

PROMETHEUS
Classification Index

ENTER ITEM DESCRIPTION: Chip

| √ | MAJOR CLASS | MINOR CLASS | ITEM | FREQ |
|---|---|---|---|---|
| | | | | |

| | MAJOR CLASS | MINOR CLASS | ITEM | FREQ |
|---|---|---|---|---|
| | Food | Potatoes | Potato chips | 93 |
| | Games | Board games | Casino chips | 47 |
| | Building materials | Wood | Wood chips | 45 |
| | Building materials | Metal | Metal chips | 32 |
| * | | | | |

GO TO: MAIN - GEO INDEX - ITEM DETAIL - VENDORS

*FIG. 3C*

PROMETHEUS
Geographic Index

110 — PROMETHEUS

ENTER GEOGRAPHIC DESCRIPTION: Princeton — 144

| REGION | MARKET | SUBMARKET | FREQ |
|---|---|---|---|
|  |  |  |  |

| REGION | MARKET | SUBMARKET | FREQ |
|---|---|---|---|
| United States | Greater NY | Princeton | 95 |
| Europe | Great Britain | Princeton | 14 |
| United States | Maine | Princeton | 12 |
| New Jersey | Princeton | University | 1 |
| * |  |  |  |

GO TO: MAIN - ITEM INDEX - ITEM DETAIL - VENDORS

*FIG. 4*

| MEASUREMENTS | |
|---|---|
| M# | Measurement |
| 1 | Distance |
| 2 | Weight |
| 3 | Count |
| 4 | Money |
| 5 | Time |

*FIG. 5A*

| PARAMETERS | |
|---|---|
| P# | Parameter Description |
| 1 | Make |
| 2 | Model |
| 3 | Year |
| 4 | Color |
| 5 | Odometer reading |
| 6 | Condition |
| 7 | Price |
| 8 | Location |

*FIG. 5B*

| UNITS | | | |
|---|---|---|---|
| U# | Units Name | M# | Relationship |
| 1 | Meters | 1 | 1 |
| 2 | Millimeters | 1 | .001 |
| 3 | Centimeters | 1 | .01 |
| 4 | Kilometers | 1 | 1000 |
| 5 | Feet | 1 | 1 |
| 6 | Inches | 1 | 0.083333 |
| 7 | Miles | 1 | 5280 |
| 8 | Kilogram | 2 | 1 |
| 9 | Gram | 2 | .001 |
| 10 | Milligram | 2 | .000001 |
| 11 | Kilogram | 2 | 1000 |
| 15 | Dollars | 4 | 1 |
| 16 | Cents | 4 | 0.01 |
| 17 | Marks | 4 | 0.65 |

*FIG. 5C*

| VALUES | | |
|---|---|---|
| VA# | VALUE | U# |
| 1 | 5200 | 15 |
| 2 | 1799 | 15 |
| 3 | 2450 | 15 |
| 4 | Red | |
| 5 | Ford | |
| 6 | Fairmont | |
| 7 | 89 | 8 |
| 8 | Good | |

*FIG. 5D*

| VENDORS | | | | |
|---|---|---|---|---|
| VN# | Primary Name | Secondary Name | Tertiary Name | Password |
| 1 | Smith | Bill | | XYZ |
| 2 | Furgessun Company | | | 123 |
| 3 | Tom's Donuts | | | 111 |

*FIG. 5E*

| BRANCHES | | | | | | | | | |
|---|---|---|---|---|---|---|---|---|---|
| BR# | VN# | Branch ID | Address | City | State | Country | Telephone | Fax | E-Mail |
| 1 | 2 | Main | 20 S. Broad | Fullerton | California | USA | 714-555-9911 | 714-555-9912 | furgessun.com |
| 2 | 2 | Los Angeles | 611 W. Fifth | Los Angeles | California | USA | 213-555-1234 | 213-555-1235 | |
| 3 | 1 | | 151 Main | Irvine | California | USA | | | |
| 4 | 3 | | | | | | | | tdonuts.com |

*FIG. 5F*

| LEVEL 1 OF ITEM HIERARCHY | | |
|---|---|---|
| L1# | MAJOR FIELD | L1 FREQUENCY |
| 1 | Advertising | 12343 |
| 2 | Air Conditioning | 44433 |
| 3 | Ambulance | 221 |
| 4 | Answering Service | 2218 |
| 5 | Appliances | 73122 |
| 6 | Attorneys | 1244 |
| 7 | Automobiles | 4532 |
| 8 | Banks | 33334 |
| 9 | Boats | 1234 |

*FIG. 5G*

| LEVEL 2 OF ITEM HIERARCHY | | | |
|---|---|---|---|
| M1# | MINOR FIELD | L1# | L2 FREQUENCY |
| 1 | Sport Utility Vehicles | 8 | 54321 |
| 2 | Passenger Cars | 8 | 85216 |
| 3 | Station Wagons | 8 | 342 |

*FIG. 5H*

| LEVEL 3 OF ITEM HIERARCHY | | | | |
|---|---|---|---|---|
| IH3# | L3 Name | L1# | L2# | L3 FREQUENCY |
| 1 | Jeep | 1 | 8 | 3431 |
| 2 | Montero | 1 | 8 | 1345 |

*FIG. 5I*

MAIN DATA TABLE (could be multiple tables)

| E# | L3# | G3# | DATE | BR# | P1# | V1# | P2# | V2# | P3# | V3# | P4# | V4# | P5# | V5# | P6# | V6# | P7# | V7# | P8# | V8# |
|----|-----|-----|------|-----|-----|-----|-----|-----|-----|-----|-----|-----|-----|-----|-----|-----|-----|-----|-----|-----|
| 1 | 1 | | 5/5/97 | 231 | 11 | 126 | 876 | 400 | 591 | 11 | 99 | 26 | 574 | 342 | 54 | 82 | 345 | 112 | 123 | 933 |
| 2 | 1 | | 5/5/97 | 11 | 45 | 322 | 34 | 653 | 165 | 221 | 578 | 845 | 232 | 126 | 788 | 356 | 951 | 22 | 123 | 65 |
| 3 | 1 | | 5/1/97 | 45 | 71 | 23 | 78 | 126 | 68 | 985 | 65 | 344 | 453 | 23 | 87 | 643 | 366 | 632 | 67 | 779 |
| 4 | 1 | | 5/1/97 | 611 | 71 | 174 | 23 | 543 | 45 | 6 | 68 | 990 | 777 | 45 | 342 | 665 | 460 | 921 | 844 | 458 |
| 5 | 154 | | 4/31/97 | 175 | 12 | 8 | 111 | 765 | 100 | 199 | 200 | 201 | 295 | 112 | 98 | 412 | 40 | 78 | 999 | 32 |
| 6 | 154 | | 4/30/97 | 144 | 19 | 378 | 232 | 996 | 798 | 45 | 555 | 786 | 86 | 100 | 199 | 45 | 32 | 61 | 16 | 7 |

FIG. 5J

| MAIN FREQUENCY TABLE | | | | |
|---|---|---|---|---|
| F# | L3# | P# | VA# | Freq |
| 1 | 1 | 1 |  | 523 |
| 2 | 1 | 1 | 23 | 200 |
| 3 | 1 | 1 | 32 | 199 |
| 4 | 1 | 1 | 445 | 1 |
| 5 | 1 | 1 | 5 | 23 |
| 6 | 2 | 2 |  | 12 |
| 7 | 2 | 3 | 34 | 12 |
| 8 | 4 | 1 |  | 94 |
| 9 | 4 | 5 | 23 | 32 |
| 10 | 4 | 5 |  | 62 |
| 11 | 5 | 7 |  | 56 |
| 12 | 5 | 23 | 43 | 56 |

*FIG. 5K*

Classification Index

ENTER ITEM DESCRIPTION:   Polymers

| | MAJOR CLASS | MINOR CLASS | ITEM | FREQ |
|---|---|---|---|---|
| | | | | |
| | Sciences | Chemistry | Polymers | 98 |
| √ | Plastics | Polymers | Polyesters | 7 |
| | Plastics | Polymers | Polyethers | 3 |
| | Plastics | Polymers | Polyamides | 3 |
| | Plastics | Polymers | Polycarbonates | 2 |
| | Building Materials | Polymers | | 1 |
| | Synthetic Materials | Organic materials | Polymers | 1 |
| * | | | | |

*FIG. 6*

| ✓ | Type of Story | Company Involved | Item | Posted By | Posted Date |
|---|---|---|---|---|---|
| | Finances | JJ Polymers | JJ Polymers earned $2.53 per share during 19 | | |
| | Human interest | Polymeric Mat | Many lives being saved through use of new p | ssbbi@zz | 98/12/01 |
| | Human interest | Armex, Inc. | Who would have thought that the first time s | | 98/11/15 |
| | Military | | Secretary of the interior announced today that | | 97/01/01 |
| | Product announce | Saudi Basic Ind | Saudi Basic Industries strengthen their positio | rdf@cc | 99/01/05 |
| | Product announce | Armex, Inc. | Armex, Inc. announced today that the first of | | 86/10/01 |
| | Patent | Smith Kile, Rh | SKB just received a patent on a new polyester | | 98/10/15 |
| * | | | | | |

CLASSIFICATION ✓
- Plastics
- Polymers
- Polyesters

FIG. 7

| | GRAPHIC | | | CLASSIFICATION √<br>■ Sports<br>■ Olympics<br>■ Drug Use | | GRAPHIC |

| √ | Type of Story | Item | Posted Date |
|---|---|---|---|
| | Medical | | > 99/02/01 |
| | Medical | The IOC announced today a new policy aimed at curtailing drug use among | 99/02/05 |
| | Medical | A new immunoassay has been developed that significantly broadens the sco | 99/02/06 |
| | Medical | UPS reports that steroids were found in the urine of Jim Irons, the world's | 99/02/03 |
| | Medical | A new urine test for steroids has been developed that distinguishes between | 99/02/02 |
| | Medical | No more cheating. Beginning as early as next summer, all athletes that wan | 99/02/05 |
| * | | | |

*FIG. 8*

Classification Index

ENTER ITEM DESCRIPTION:  Clinton

| | MAJOR CLASS | MINOR CLASS | ITEM | FREQ |
|---|---|---|---|---|
| | | | | |

| | MAJOR CLASS | MINOR CLASS | ITEM | FREQ |
|---|---|---|---|---|
| | Politics | Clinton | Sex Scandal | 40 |
| | Clinton | Impeachment | | 33 |
| √ | Clinton | Hillary | Senate seat | 10 |
| | Human Interest | Clinton | White House Sleepovers | 5 |
| | Labor Unions | Politics | Clinton | 5 |
| | Fundraising | Clinton | | 3 |
| * | | | | |

*FIG. 9*

| GRAPHIC |

CLASSIFICATION √
- Clinton
- Hillary
- Senate Seat

| GRAPHIC |

| √ | Freq | Question | Adjective | Yes | No | Num | $ | avg |
|---|------|----------|-----------|-----|-----|-----|-----|-----|
|   | 58 | Should Hillary run for a senate seat in the year 2000? | | 5558 | 1212 | 6770 | | |
|   | 42 | How much would to contribute to the Hillary 2000 senate campaign? | | | | 4212 | 531201 | 12.60 |
|   | 35 | How would you describe the likelihood of success | | | | | | |
|   | 12 | Should Hillary run for president instead of the senate? | | 22 | 3 | 25 | | |
|   | 5 | Would Hillary be too liberal as a senator? | | 0 | 5 | 5 | | |
|   | 1 | As a senator, should Hillary focus on women's rights? | | 1 | 0 | 1 | | |
| * | | | | | | | | |

FIG. 10

SELF-EVOLVING DATABASE AND METHOD OF USING SAME

This application is a continuation-in-part of Ser. No. 09/128,116, filed Aug. 3, 1998, now U.S. Pat. No. 6,035,294, and also claims priority to Ser. No. 60/123,019 filed Mar. 4, 1999.

BACKGROUND OF THE INVENTION

This invention relates to the field of databases that index large numbers of different types of items.

BACKGROUND

The Internet is by now the world's largest computer network, interconnecting millions of computers. One side effect of this large size is that the vast amount of information available on the Internet is often extremely difficult to access. Similar problems tend to occur on any large network, and in this discussion the Internet is used merely as an example of such a network.

Several attempts have been made to index the Internet, but each of these attempts has fallen short. Probably the most primitive indexing scheme comprises a simple alphabetical indexing of items, such as URLs in the case of the Internet. Unfortunately, such an index is little more than an electronic "white pages," and is generally only useful if one knows the exact name or address of the user to be contacted. A straight alphabetical index also provides little or no ability to access information by subject matter, unless the name happens to include an indication of the subject matter, as in "Bob's Pharmacy." These shortcomings are quite annoying when the number of addresses being indexed is relatively small, and present profound difficulties as the number of URLs grows.

Another method of indexing information involves keyword searching. In keyword indices information is contained in freeform text fields, and then the system, the system manager, or the user indexes key words found in the text. A considerable amount of scientific information is presently indexed in keyword indices such as Medline™, and literally millions of web pages of the Internet are indexed by such services as GOTO™ and Lycos™. Although advantageous relative to simple alphabetical address indices, keyword indices are still impractical where the amount of information is relatively high.

One major problem is that keyword searching is inherently under-inclusive. For example, if one is looking for a red colored automobile, a keyword index would only be useful to the extent that all red cars are indexed using the color red. Cars indexed as rose or magenta, crimson, ruby, vermilion, or scarlet would not be located by a search for "red." Keyword searching is also inherently over-inclusive. A search for a red Mercedes™ may well identify a story about a woman named Mercedes who is wearing a red dress. There are presently attempts being made to provide proximity and content-based keyword searching, including the use of XML standards, but such attempts have so far been seen only marginal benefit. Even if keyword searching could be utilized to carefully exclude irrelevant information, it would still tend to be under-inclusive. Moreover, keyword searching of any degree of sophistication inherently suffers seriously diminishing utility as the number of records increases. For example, it does little good to conduct a search for a desired automobile if the database locates 5000 records, and there is no practical way of further limiting the search without rejecting desired records.

A great deal of information on the Internet is now stored in specialty databases. In specialty databases the subject matter is limited to a particular type of product or service, and parameters are provided which specifically relate to that subject matter. Thus, a specialty real estate database may store data according to the parameters of property type (commercial, residential, undeveloped land, etc.), location, square footage, number of bedrooms, number of baths, style (Mediterranean, Cape Code, traditional, etc.), and price. Additional information may also be stored in a comment or image field, but such information is typically not searchable or sortable, and is difficult to standardize. In addition, specialty databases are unable to properly handle multiple types of items, i.e., items which are generally described using inconsistent or otherwise different parameters. Thus, a real estate index is very poorly adapted for storing information relating to clothes or automobiles because the data parameters required for these items are almost completely inconsistent with the parameters useful for real estate.

One technique that has proven useful for organizing information relating to multiple types of items in a generic index is a hierarchical "yellow pages." Thus, for example, the Big Book™ collects together Internet addresses for various categories such as attorneys, bookkeepers, florists and so on. The Big Book™ also indexes Internet addresses according to geographical location. Thus, one can select family law attorneys in Miami, rather than all attorneys, or all family law attorneys throughout the country. Despite these advantages, the "yellow pages" type of index is still not particularly useful where the subject matter one is searching for is not well categorized, or where the categories are vague or counterintuitive. For example, if one is searching for zipper manufacturers, a "yellow page" type index may not have any categories specifically for zippers, or zippers may be listed under some obscure category such as "interlocking clothing connectors." Still further, such indices are notoriously cumbersome when searching for related products. For example, if one is searching for all types of clothing connectors, a "yellow pages" type of index may require separate searches for zippers, buttons, snaps, etc.

Similar problems exist with respect to limiting the searches by geographical location. For example, an index may well have categories for continents, countries, major metropolitan markets, or even specific cities, but a user must still discover on his own how the database treats a particular address such as "upstate" New York. In short, unless a user knows how the index is organized, it may be nearly impossible to find desired information in a convenient manner.

A better solution for organizing information in a generic index involves hierarchical sorting of products and services as is done by Netscape™ and others. In a hierarchical index one can begin with a high level category, and then logically work down to a lower level category by selecting choices from various menus. Thus, in selecting patent attorneys one might sequentially choose the following categories: Services (level 1), Business (level 2), Legal (level 3), Attorneys (level 4), and finally Patent (level 5). The same strategy can also be applied to geographical locations. One may, for example, select Los Angeles by choosing North America (level 1), United States (level 2), California (level 3), Southern California (level 4) and Los Angeles (level 5).

However, even generic indices that select records hierarchically are unsatisfactory for accessing huge amounts of information. One problem is that presently known hierarchical indices do not allow users to adequately filter down to smaller subsets of records, or to sort the selected records based upon parameters having particular meaning for the field being searched. A search in the field of automobiles can be used to illustrate these shortcomings. If one searches a presently known Internet index for used Ford™ automobiles, one might locate thousands of cars for sale. Clearly that number is too large for a user to realistically review every listing. Even if the number of selected records could be reduced by limiting the subject matter to a particular model, or by limiting the geographical location to a particular city, there might still be several hundred cars for sale, and it would be a terrible waste of time to consider each of those records if the user is only looking for cars with purchase prices of less than $3000. Specialty indices may allow a user to limit the search by price, color, body style, and other parameters all at the same time, but that capability is not available on generic indices which additionally cover other types of items, such as real estate and computers.

Even if generic indices could be developed that use different sets of parameters for different products, the creation costs of such an index would be enormous. There are millions of different types of products and services that need to be indexed, let alone type of information not related to products or services. Not only would it be impractical for any given developer to enter the millions of different parameters required, but it would be impractical for any given developer to even know what parameters are appropriate for all the different products, services, and information categories. For example, someone who understands parameters for computer screens may well not know the appropriate parameters for ball bearings, or for the thousands upon thousands of "chat rooms". Only those individuals having interests in the relevant subject matters would likely know what parameters are best to use. Moreover, the parameters that are best for one person may be unsuitable for another person, and the most suitable parameters for any given subject matter may even change over time. In short, as marketplaces and information throughout the world evolve, it would continue to be unrealistic for any given developer to keep up with the evolution of desired parameters.

Thus, there is a continuing need to provide a generic index that can effectively handle multiple types of products having multiple parameters.

SUMMARY OF INVENTION

The present invention provides self-evolving generic indexing system and methods for storing and retrieving information on multiple types of items. The index is self-evolving in that at least some of the classifications, parameters, or values used to describe different items vary over time, with subsequent users being guided in their choices by summary comparison usage information (SCUI) derived from the choices of previous users.

In preferred embodiments the systems and methods described herein can be applied to substantially all products, services, and information. Thus, contemplated systems and methods can be used to describe every conceivable type of product and service currently listed in consumer or business-to-business telephone yellow page books, as well as all products and services commonly listed only in specialty consumer or industry catalogs. The types of information that may be used are equally universal. It is specifically contemplated, for example, that systems and methods described herein may be utilized to index such diverse types of information as news items, historical facts, book reviews, questionnaires, opinion surveys, case law, and the topics discussed in various chat rooms.

The potential universality of the presently described systems and methods can also be viewed from a functional perspective. It is contemplated, for example, that the myriad products, services, and information potentially accessible may be utilized for marketplace purposes, such as buying and selling, inventorying, etc. But it is also contemplated that the data may be used for listing and sorting of people, events, or ideas, and summarizing or performing other statistical analyses.

The indexing systems and methods contemplated herein are preferably embodied in one or more databases, that may reside on one or more computers. General purpose computers such as PCs, mid-size, or even larger computers can be used, and such computers preferably use standard operating systems such as UNIX or NT, and standard database managers such Sequel Server 7 or Oracle. The computers preferably interact with users using HTML, XML, or other standard protocols, and are either directly wired to the users or employ modems or other equipment permitting telecommunication.

Preferred database structures include those having multiple tables for item classifications, parameters, values, and parameter-value pairs. It is especially contemplated that parameters and values can be cross-utilized across with respect to many different types of items. Thus, both the parameter "color" and the value "red" may be used to describe such diverse items as automobiles, shoes, and telephones. Usage information for item-parameter and item-parameter-value sets is preferably kept in still other tables, and the data is preferably kept substantially current using at least a near real-time basis for updating.

Summary comparison usage information is preferably communicated to users in the form of combo boxes or other windows, listing the selections in order of descending usage. Thus, in the field of automobiles, parameter choices may occur in the order of make, model, year, mileage, color, condition, price, engine size, seat material, accessories, etc. With respect to the parameter of color, color choices may occur in the order of white, black, red, green, and blue. SCUI may be expressed in other ways besides listing order, such as by displaying a percentage, or an absolute number. It is especially contemplated that SCUI will be displayed using both listing order and percentage. Color choices may, for example, be displayed as white (28%), black (25%), red (12%), green (6%), blue (5%), etc.

Preferred systems and methods also include at least one mechanism by which users can add classifications, parameters, and values as desired. Thus, even though the item "bananas" may have been characterized as "foods/fruits/bananas", a subsequent user may still characterize bananas using the new classification "imports/foods/bananas", or perhaps "nutrition/fruits/bananas". Similarly, a user may add the parameters "avg bunch size" or "importer", or add the value "golden". In short, providing users with SCUI from previous users assists in evolution of the database by guiding subsequent users in their choices, and the ability to add new add classifications, parameters, and values assists in evolution of the database by keeping the database dynamic, preventing subsequent users from being constrained by the choices of previous users.

The inventive subject matter can, of course, be viewed from many different perspectives. From one perspective the subject matter can be viewed as a self-evolving database system comprising: a data structure that stores goods and services as combinations of item classifications, parameters, and values, wherein at least some of the classifications, parameters, or values used to describe different items vary over time; and at least one data interface that guides end users in their choices of the combinations by displaying summary comparison usage information derived from the choices of previous users. In preferred embodiments the self-evolving database system further comprises a data interface that allows the end users themselves to add one or all of new classifications, new parameters, and new values, which can then be list selected by subsequent users in describing their own items.

From another perspective the subject matter can be viewed as a method of storing marketplace information for multiple types of items in a database, comprising: providing a user with a first data entry interface for selecting an item classification (which may or may not be hierarchical); providing the user with a parameters list that displays a plurality of parameters previously related to the item classification by a plurality of previous users during a process of loading item descriptions; providing a second data entry interface that allows the user to add an additional parameter to the parameters list; and providing a third data entry interface that allows the user to associate individual parameters from the parameters list with individual values from a values list; thereby describing an item falling within the item classification as a set of parameter-value pairs. Preferred embodiments include displaying to the user classification usage information, and/or parameter usage information, and/or value usage information. That usage information may or may not contain historical information.

From another perspective the subject matter can be viewed as a method of indexing an item on a database, comprising: providing the database with a structure having a plurality of item classifications, parameters, and values, wherein individual parameters are independently related to individual item classifications, and individual values are independently related to individual parameters; guiding the user in selecting a specific item classification for the item from the plurality of item classifications; storing the item on the database as a plurality of user-selected item classification parameter/value combinations; and guiding the user in selecting one or both of (a) the parameters of the combinations by displaying relative usage information for a plurality of parameters previously used by other users, and (b) the values of the combinations by displaying relative usage information for a plurality of values previously used by other users.

From still another perspective the subject matter can be viewed as a computer implemented system in which a plurality of items are described as collections of parameter-value pairs, comprising: an items classification set having a plurality of item classifications; a parameters set having a plurality of parameters; a first interface for selecting an item classification from the items classification set, wherein the selected item classification has a previously stored relationship to a subset of the parameters set; a second interface that prompts a user to describe an item of the plurality of items by selecting a parameter from the subset of the parameters set, and from usage information regarding the subset of the parameters set; a values set having a plurality of values, wherein a subset of the values set has a previously stored relationship with the selected parameter; a third interface that prompts the user to select a value from the subset of the values set; thereby describing the item at least in part by a relationship among the selected item classification, the selected parameter, and the selected value.

From still another perspective the subject matter can be viewed as a computer implemented system for indexing, comprising: a set of previously existing subsets, each subset containing an item member, a parameter member, and a value member; an interface for adding a new subset to the set of previously existing subsets, the new subset containing a selected item member, a selected parameter member, and a selected value member; a first interface prompting for selection of the selected item member by presenting a list of items that are members of any of the previously existing subsets; a second interface prompting for selection of the selected parameter member by presenting a list of parameters that are members of any of the previously existing subsets containing the selected item member, and presenting usage information for the list of parameters; and a third interface prompting for selection of the selected value member of the new subset by presenting a list of values that are members of any of the previously existing subsets containing the selected item member and the selected parameter member, and presenting usage information for the list of values.

Various objects, features, aspects and advantages of the present invention will become more apparent from the following detailed description of preferred embodiments of the invention, along with the accompanying drawing, in which like items are represented by like numerals.

BRIEF DESCRIPTION OF THE DRAWINGS

FIGS. 3A–3C are examples of alternative applications of the item classification interface of FIG. 2, applied to queries for "sport utility vehicles" and "chips".

FIG. 4 is an example of a preferred geography interface window.

FIGS. 5A–5K are diagrams of record, table or other data structures that can be advantageously used in conjunction with an index according to the present invention.

FIG. 6 is an example of the item classification interface of FIG. 2 as applied to a query for "polymers".

FIG. 7 is an example of a preferred data interface providing information on "polyesters".

FIG. 8 is an example of a preferred data interface providing information "drug use".

FIG. 9 is an example of a preferred data interface providing information on "Clinton".

FIG. 10 is an example of a preferred data interface providing information on a questionnaire.

DETAILED DESCRIPTION

Figure 1:
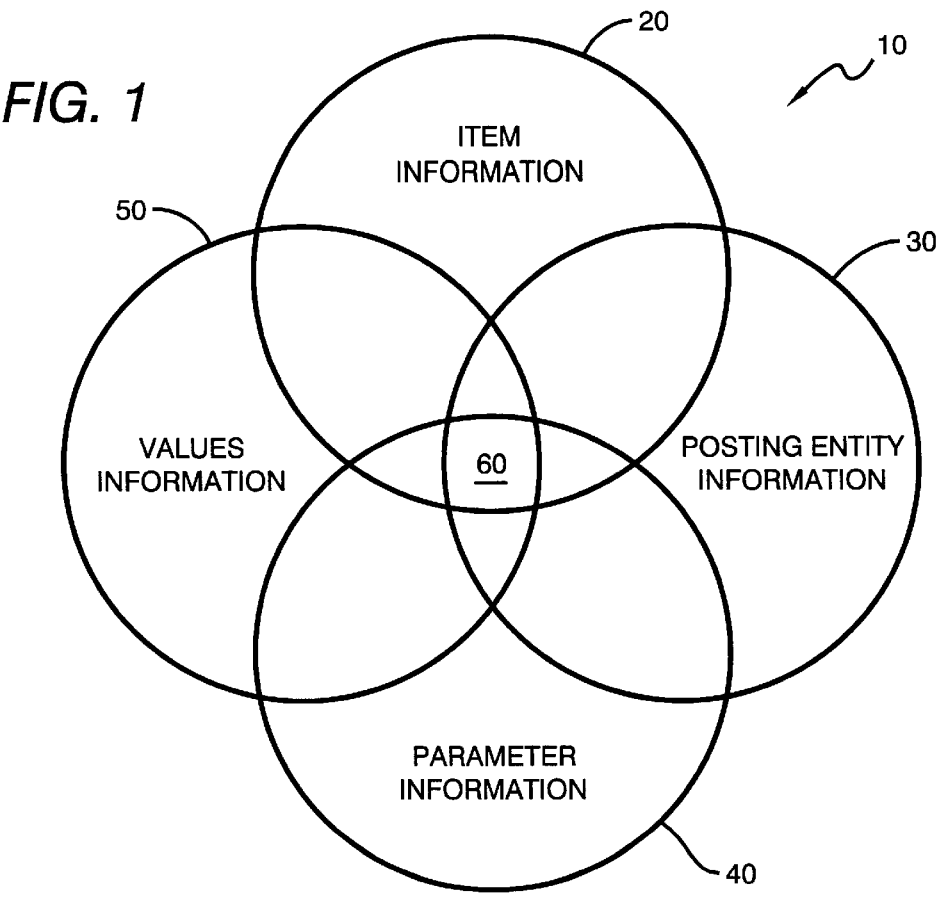
FIG. 1 is Venn diagram of data in a preferred index according to the present invention.

In FIG. 1 a preferred database 10 generally includes four intersecting sets of information: item information 20, posting entity information 30, parameter information 40 and values information 50. The intersection 60 of these sets 20, 30, 40, 50 represents records of particular interest to a user.

Figure 2:
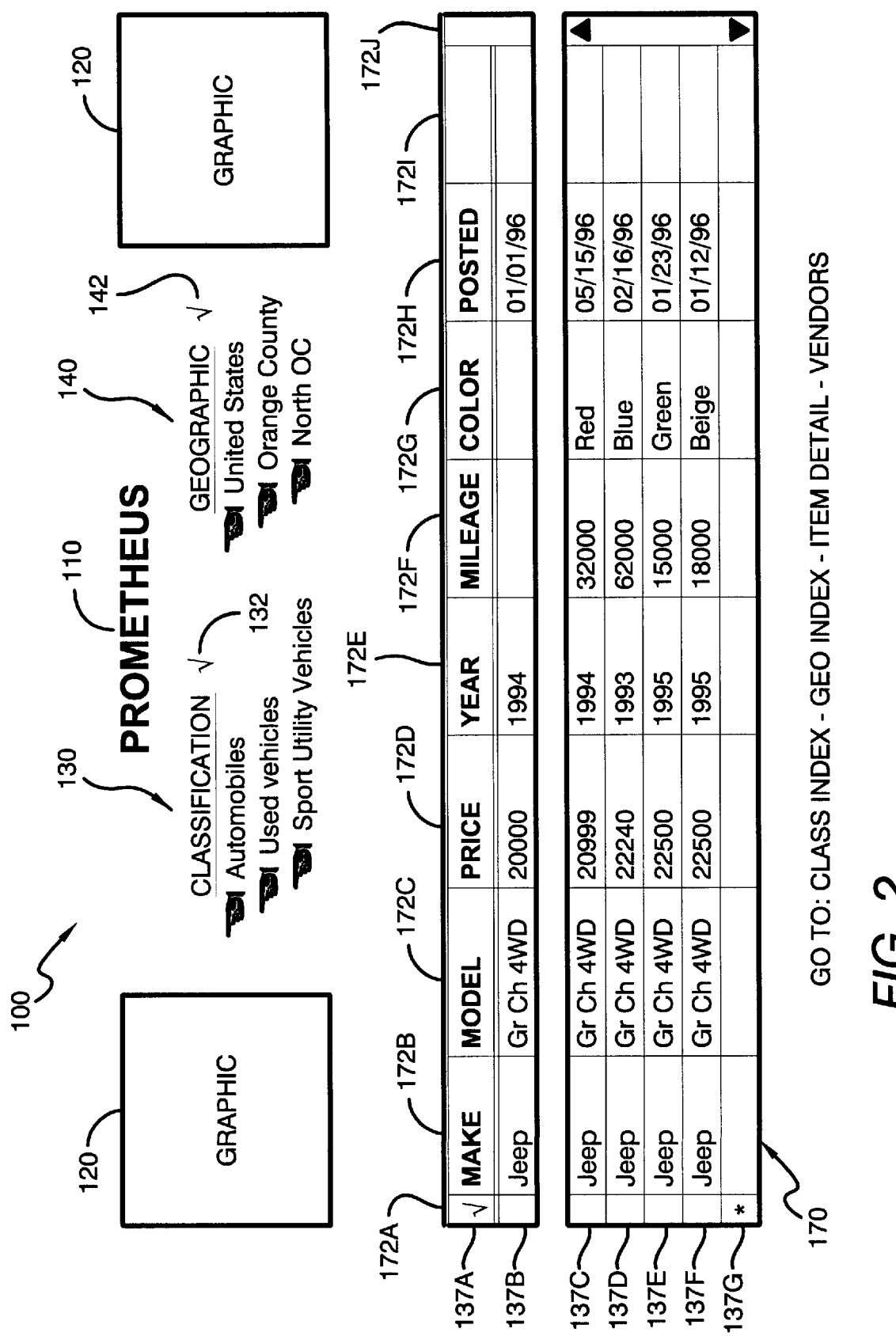
FIG. 2 is a schematic of a data interface providing information on sport utility vehicles.

In FIG. 2 a preferred data interface screen 100 generally comprises a title 110, advertising or other graphics 120, an item classification hierarchy 130, a market hierarchy 140, and a data selection and display matrix 170.

Title 110 is used for identification purposes only, and is completely optional. Here, the name PROMETHIUS is used to identify the database, but any suitable trademark or descriptive name may be used.

The advertising or other graphics 120 are again entirely optional, and are shown here merely for the sake of exemplification. On the other hand, it is contemplated that advertising space may be sold to vendors as a significant source of funding, and that such advertising may be context sensitive to increase its value to vendors. Thus, for example, when a user is viewing information on airline fares, the graphics 120 may advantageously display advertising for an airline. Similarly, when a user is viewing information on automobiles in Los Angeles, the graphics 120 may advantageously display advertising for a Los Angeles area automotive dealer.

Item classification hierarchy 130 is advantageously 3 to 5 levels deep, and is preferably arranged in a logical manner to provide convenient access to users. In the particular example of FIG. 1, the user has selected "Automobiles" as the first or "highest" level, "Used vehicles" as the second level, and "Sport Utility Vehicles" as the third level. There are innumerable ways to establish and maintain classifications for these various levels, but at the inception of a database or database system, it is contemplated that preset classifications will be established for at least the first two levels, and preferably the first three levels. Optionally, however, it is contemplated that item classifications on every level can be open to supplementation by users as described below. This will almost certainly result in categorizations that are not mutually exclusive, i.e., categorizations that overlap with each other. But such overlap is thought to be a positive factor, for the same reasons that a city may advantageously have multiple shoe stores—the multiplicity is what allows users to express themselves, and encourages the database to evolve in appropriate directions.

In one contemplated embodiment, each level of the item hierarchy may have a drop down menu that presents an alphabetic list of choices. Thus, for example, the highest level of the item hierarchy may include the following choices: Advertising, Air Conditioning, Ambulance, Answering Service, Appliances, Attorneys, Automobiles, Banks, Boats, etc. Choices in the second level would then depend on what choice is picked at the first level. For example, the second level choices under Automobiles may include: New Parts, New Vehicles, Used Parts, Used Vehicles. In the same manner, choices in the third level would depend on what choice is picked at the second level. Continuing with this example, third level choices under Used Vehicles may include Passenger Cars and Sport Utility Vehicles.

Item selection may advantageously be accomplished on a subsidiary item selection screen by clicking on an item screen selector such as item screen selector button 132. The subsidiary item selection screen may appear as in FIGS. 3A, 3B and 3C, with FIGS. 3A and 3B corresponding to the selection of "Sport Utility Vehicles" on FIG. 2, and FIG. 2C exemplifying selection of an unrelated item, "chip".

FIG. 3A again depicts an optional title 110, a description entry field 134, and a data table 135. In this particular data table 135 has six columns: item selection column 136A, major category column 136B, minor category column 136C, item description column 136D, usage column 136E, and slider column 136F, and seven rows: title row 137A, limitation row 137B, data rows 137C–137F, and new data entry row 137G. The selection of parameters for each of the columns may be dictated individually by the user, or more preferably at least some of the columns are defaulted to the most commonly used parameters for the item classification chosen.

In the preferred embodiment shown, the data rows 137C–137F are all filled in by the system based upon the description entered by the user in the description entry field 134. Subsequently, rows may advantageously be selected in which the description matches any of the major, minor or, item descriptions 136B–136D. Thus, based upon the user having entered "Sport Utility Vehicles" in description entry field 134, the system displays data row 137C in which "Sport Utility Vehicles" matches data in the item description column 136D, data rows 137D and 137F in which "Sport Utility Vehicles" matches data in the minor category column 136C, and displays data row 137E in which "Sport Utility Vehicles" matches data in the major category column 136B. It is also contemplated that the user can enter whatever data he or she wants in new data entry row 137G, creating major, minor and item descriptions at will. What is expected to maintain general consistency throughout the system is that the user can see what categories have been chosen by others in the usage column 136E, and will presumably want to use categories that have proven to be popular in the past.

The term "user" is employed herein to mean an end-user of the database, i.e. an ordinary person or business who is either listing an item on the database, or looking for an item, or both. One of the big distinctions over the prior art is that users of the database can add new classifications, and/or parameters, and/or values, rather than waiting for a programmer or systems designer to do so. In that manner the aggregate of users largely control the evolution of the database rather than a few programmers or other individuals. That is what makes the database or system self-evolving.

The term "usage information" is employed herein in a very broad sense to include information relating to occurrence, absolute or relative frequency, or any other data that indicates the extent of past or present usage with respect to the various choices. It is contemplated, for example, that the choices for which usage information is displayed would include one or more of item classifications, geographic classifications, parameters, and values. It is also contemplated that the usage information displayed may relate to subsets of choices determined by a user's own previous responses. Thus, when selecting a minor item classification, the system may display a listing of possible minor item classes determined by the user's selection of major classification, along with relative usage information among the Patent displayed minor classes. Similarly, the item descriptions displayed, and the corresponding usage information, would preferably be a function of the major and minor item classes selected. As yet a further example, the parameters and/or values displayed, and the corresponding usage information would preferably be a function of the item selected, and possibly also of the geographic class(es) selected.

The term "usage information", however, is not unlimited in scope. Usage information as employed herein is meant to be inherently comparative and summary in nature, so that usage information does not include a user successively performing keyword searches and viewing the numbers of hits independently of one another. Also, the terms "historical usage information" and "usage information" are used herein in slightly different manners. Historical usage information necessarily includes data that has accumulated over time, while usage information may or may not include data, and may therefore be limited to information gleaned from data currently on the system.

Figure 3A:
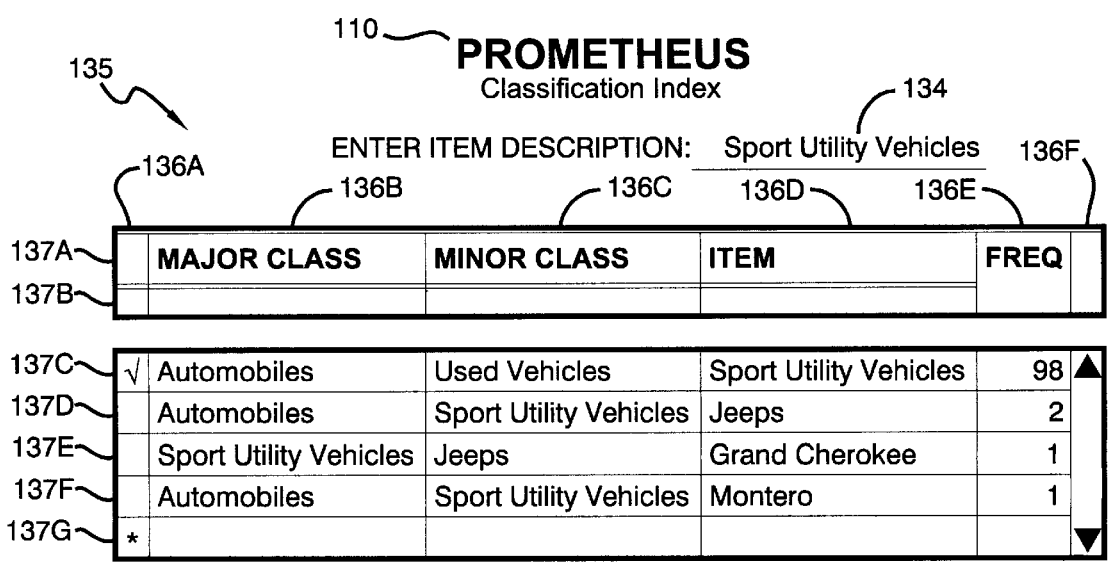

Usage information can be presented in many ways. In FIGS. 3A–3C, usage information is shown on a relative frequency scale as an integer from 1 to 100, with the data rows 137C–137F sorted from highest frequency to lowest frequency. In other embodiments, usage information can be displayed by depicting absolute frequency, by depicting occurrence of number of uses or "hits", or even by displaying data or data rows in different colors or using other identifying indicia.

It should be appreciated, however, that not all prior usage information is summary comparison usage information as that term is employed herein. For example, some prior usage information is commonly provided in ordinary listings of automobiles for sale. Such items as price are very frequently included in such listings, and subsequent users can see for themselves what prices are being asked for particular makes, models and years. In fact, it is by perusing such lists that many individuals determine the price at which they list their own car for sale. But such listing provide only individual usage information for each item, they do not provide summary information. The subsequent users need to summarize that information for themselves. Nor do automobile "for sale" listings provide summarize the information in a comparative format, such as comparative listings of car prices by frequency. Moreover, while it is true that some indices such as used car guides do provide summary comparison information for various makes, models, and years, that information is based upon factors other than usage information for the database at hand, and is not accompanied by offers for individual cars.

Depending on the intersection between information in the database and the data entered into the description entry field 134, there may be an unwieldy number of data rows displayed. In that instance it may be helpful for the user to limit the number of data rows by selecting one or more values for a particular major category, minor category or item description. This can be accomplished in many ways, such as with a pull down menu. In FIG. 3B, the data rows have been limited by entering the choice "Automobiles" as the major category in row 137B. This selection has limited the data in rows 137C, 137D and 137E of FIG. 3B to data that was present in rows 137C, 137D and 137F of FIG. 3A.

Also, by way of example in FIGS. 3A and 3B, the user has selected a particular value row for inclusion into the main data interface screen of FIG. 2. This has been accomplished by clicking on, or otherwise marking column 136A of row 137C in both FIGS. 3A and 3B. Presently it is contemplated that a user will select only one value row, but, of course, it is also possible that the system could be designed to accommodate selection of multiple data rows.

FIG. 3C is another example of an item hierarchy selection screen. Here, the selection interface is identical to that already described with respect to FIGS. 3A and 3B, but instead of selecting for item description "Sport Utility Vehicles", a user is selecting for item description "chip". This particular selection is instructive because there are many different types of chips, from potato chips to casino chips to various types of building materials. It is contemplated that this particular interface will allow a user to select among these choices more readily than with any previous system.

FIG. 4 is analogous to FIG. 3A, except that major category, minor category and item description columns 136B–136D have been replaced with region category 146B, market category 146C and submarket category 146D columns. As with item classification, it is contemplated that usage information for the geographic classifications may be displayed as shown in column 146F, the display of data rows can be limited by entry or selection of data in limitation row 147B, one or more data rows can be selected in column 146A, and data from a selected row can be echoed back to the market hierarchy 140. Supporting interface screens corresponding to FIGS. 3B and 3C are also contemplated, but are not shown.

Focusing again on FIG. 2, data selection and display matrix 170 has 10 columns: a row selection column 172A, parameter columns 172B–172I, and a slider column 172J, and seven rows: header row 174A, limitation row 174B, data rows 174C–174F, and new data entry row 174G.

It is contemplated that the parameters shown in row 174A of columns 172B–172I can be selected by the user, as from a drop down menu (not shown). Alternatively, this and other "drop-down" menus can advantageously be replaced with pop-up windows that overlay other windows on an interface screen. The drop down or pop-up menu would preferably list only those parameters which have been used in the past by other users with respect to the item in item classification hierarchy 130, and would preferably list such parameters with some sort of usage information, such as was described above with respect to item and market selection in FIGS. 3A–3C and 4. In this particular example, the user has selected parameters "make", "model", "price", "year", "mileage", "color", and "posted". An eighth parameter could have been selected for column 172F, but in this example the user chose not to add an eighth parameter. Ninth and further parameters could also be selected if the system were set up to do so, and the screen could scroll left and right to conveniently accommodate additional such parameters. But it is presently contemplated that eight parameters is an optimal the maximum number of parameters. Also, in sophisticated embodiments the widths of the columns may advantageously be varied by the user. On yet another screen (not shown), or perhaps as part of the drop down parameter selection menus, or even in row 174A, the user can enter a new parameter, either one that is entirely new or one that has been used before with respect to another type of item.

Sorting can take place in any number of ways, or alternatively the data list can be non-sorted. For simplicity, it is contemplated that the data rows will be sorted according to parameters selected, and the values for the different parameters. Thus, in FIG. 2, the primary sort is the first parameter selected, (make), the secondary sort is the second parameter selected, (model), the tertiary sort is the third parameter selected, (price), and so forth. In other words, sorting is preferably performed left to right.

In row 174B it is contemplated that the user can select a specific value (or a range of values where the parameter contemplates a numeric value) to limit the number of data rows. For columns where no data is entered in row 174B, the system preferably has no additional selection for the corresponding parameter.

Data rows 174C–174F present the parameter data available in the system for records that match the item hierarchy 130, the market hierarchy 140 (if given), and the various values set forth in limitation row 174B. Of course, since users may be free to load data on the system by describing items according to any parameters they see fit, data may well be unavailable for any given parameter chosen by a subsequent user. Thus, it is contemplated that the lack of data for a particular parameter would serve to limit selection only if a data value for that parameter was given by the searching user. For example, if a user looking for automobiles selected weight as a parameter, but gave no data for the weight parameter, then the system would still pull up automobiles matching the user's other criteria even if records for those automobiles did not include weight data. On the other hand, if the user selected weight as a parameter, and also gave a weight value of >4000 pounds, then only automobiles matching all other parameter value pairs, and which have weight greater than 4000 pounds would be selected.

New data row 174G can be used for entering new data, preferably up to one data value for each parameter selected.

Significantly, each user will probably be limited to a maximum number of parameters, both to keep the size of the database within some sort of manageable limits, and to encourage users to employ parameters that others have used before. In this manner, each user will likely enter less than about 8–10 values for each item.

It should now be apparent to those skilled in database design that the self-evolving approach can be used for all manner of products and services. For example, the self-evolving database concept is readily applied to employment want ads. In such cases it is likely that users would add parameters such as nature of employer, location, educational requirements, experience requirements, duties, salary, etc. As another example, the self-evolving database concept is readily applied to personal advertisements. There, likely parameters include marital status, race, sex, sexual preferences, hobbies, likes and dislikes.

It should also apparent to those skilled in database design that the inherent flexibility in parameter selection allows users to store and access information objects other than text. For example, users may choose specialized parameters that store image files such as TIFF or GIFF files, video clips such as MPEG or AVI files, audio clips such as WAV files, word processing documents such as WORD or WordPerfect files, tables such as Excel files, hyperlinkable URLs, and so forth. The URLs are thought to be especially useful as links to the web sites of others, or even simply to video or other files. Users may also choose to store entire audio-video electronic commercials such as those marketed by eCommercial.com, or slide shows, net-decks, or advertising coupons. Some of the parameters may be used to store multiple types of files. In preferred embodiments appropriate icons would appear in cells of data rows of the data selection and display matrix. Users would click on the icon, and the system would then display the contents of the file. It is also contemplated that an interface would be provided for users to download such files.

Still other specialized parameters may be employed to conduct auctions. For example, a user may choose to list the items of interest using the parameters of "last price bid", "last bid date", and "closing date/time". This capability is especially powerful because it allows a user to view information stored on all items of interest, whether such items were listed as fixed price offers, auctions, or whatever. A user looking for a particular book, for example, would be presented with a single table showing fixed price offerings from volume retailers such as e-bay™ and Barnes & Noble™, as well as offerings of smaller companies, individuals selling new and used copies of the book, offerings by auction, and so on.

In yet other aspects of preferred embodiments search strategies, which would include the item characterization, parameters, and values used to obtain a results set, can be stored either locally to a user (perhaps as a cookie), or stored centrally. This would allow a user to develop a search over time, and then run the search again using a keyword or other locator, rather than having to reconstruct the entire search. Of course, one of the parameters utilized across all item characterizations is likely to be listing date or update date, and searches could be stored that only look for items entered after the last time the search was run. In still another variation the system could store a search strategy, run the strategy periodically, and then e-mail the user who entered the search only upon selecting a non-null results set.

Database Implementation

Of course, all of the above can be implemented in any number of ways, provided that the user is able to select choices based in some manner upon the usage (relative or absolute) of those choices by others. Nevertheless, some implementations are undoubtedly better than others, and it is contemplated that the system can be implemented as discussed below with respect to FIGS. 5A–5K.

FIGS. 5A–5D represent portions of sample tables for measurements, parameters, units, and values, respectively. The measurements table of FIG. 5A would likely be maintained by a system administrator, and would advantageously include all likely types of measurements that users would want to use. It is important to note that the term "measurements" refers to categories of measurements rather than units, or parameters for which such measurements may be employed. Thus, typical measurements are distance, weight, count, money, time, and so forth, and by way of example these particular measurements are listed as the first five records of the sample measurements table.

The parameters table of FIG. 5B would likely be maintained by individual users as a function of entering data as described above, and will therefore likely contain thousands of user defined parameters, all of which are used in one way or another to describe one or more items. By way of example, parameters may include make, model, year, color, odometer reading, condition, price, and so forth, and these parameters are listed as the first seven records of the sample parameters table.

The units table of FIG. 5C would likely be maintained by a system administrator, and would advantageously include all likely types of units that users would want to use. The record number is listed in the first column, the name of the unit is given in the second column, a cross-reference to the record number of the related measurement is given in the third column, and the interrelationships among the various units in this grouping is given in the fourth column. For example, records 1 through 7 in FIG. 5C all relate to units used to describe distance, which is the first record in the measurements table of FIG. 5A. Thus, column 3 of FIG. 5C for these rows all show the numeral 1, to point to the second record in the measurements table of FIG. 5A. Similarly, records 8 through 11 in FIG. 5C all relate to units used to describe weight, which is the second record in the measurements table of FIG. 5A. Thus, column 3 of FIG. 5C for these records all show the numeral 2, to cross-reference the second record in the measurements table of FIG. 5A.

The values table of FIG. 5D would usually be maintained by individual users as a function of entering data as described above, and will therefore likely contain many thousands of user defined values. In this particular case, the value record number is listed in the first column, the literal of the value is listed in the second column, and a cross-reference to the units table of FIG. 5C is listed in the third column. In this manner, the first three data rows of FIG. 5D correspond to a value of 5200 dollars, 1799 dollars and 2450 dollars, respectively. Similarly, the fourth record corresponds to a value of "red" with no units, and the seventh record corresponds to 89 kilograms.

One may, of course, ask whether the complexity of the above-described table structure is really necessary. The answer is that such complexity is not necessary at all, but is preferred because it is operationally efficient. The system is also flexible in that it can accommodate users from many different countries, who may enter data using all sorts of different systems. Thus, the system as described herein can readily received data in meters, but display the data in miles.

FIGS. 5E and 5F are sample tables that may be employed to store data regarding vendors, where the term "vendors" is used in its broadest possible sense to mean any person, company or other entity providing information. In many instances vendors will be those storing information on the system, and seeking a buyer. In other instances, vendors will be those merely advertising information, such as web site identifiers, but offering nothing at all for sale. In still other instances an intermediate situation may apply.

In view of the descriptions herein of the other tables, the headings of the tables in FIGS. 5E and 5F should be self explanatory. Among other things, the first column of the table in FIG. 5F is the branch record number, while the second column is a cross-reference to a vendor record number. It is contemplated that data in these tables will be entirely maintained by users, with access to individual records being limited according to a password maintained in the fifth column of the table of FIG. 5E, or by some other security arrangement.

As noted above with respect to other tables, a system using data tables of FIGS. 5E and 5F may appear overly complex. But in reality such a system is contemplated to be highly efficient. According to the data tables shown, for example, a single vendor may have many addresses linked to a single vendor name.

FIGS. 5G through 5I show tables containing names of major, minor and item classifications, respectively. Naturally, if there were two or four levels of item hierarchy, then two or four tables may advantageously be used. Similarly, it is possible to store the relevant information for three levels in fewer than, or more than, three tables.

The table of FIG. 5G also has a frequency of use counter in the third column, which allows the system to conveniently display actual or relative frequency of use of the various major classifications. Such frequency information may, for example, be displayed in a drop down menu in the interface of FIG. 2. The frequency information will presumably aid a user in choosing among various classifications. For example, a user might learn that the classification of Automobiles is used approximately 100 times more often than Cars, and therefore decide to choose the major classification of Automobiles.

The table of FIG. 5H contains names of minor classifications, and additionally has a cross-reference to major classification records in the third column, and a frequency of use counter in the fourth column. Using this information, the system can provide a user with relative or actual frequency information for minor classifications related to a previously chosen major classification.

The table of FIG. 5I contains names of classifications in the third (i.e, item) level, of classification. The table additionally has a cross-reference to major classification records in the third column, a cross-reference to minor classification records in the fourth column, and a frequency of use counter in the fifth column. Using this information, the system can provide a user with relative or actual frequency information for item classifications related to a previously chosen major and minor classification combination.

Another set of three tables (not shown) would also probably be employed to store names and frequency information regarding the various geographic classifications. Again, the number of tables may vary according to the number of levels used by the system.

FIG. 5J depicts the "Main" data storage table. While there are many possible configurations for storing the information shown, and while different information can be stored than that shown here, the Main data storage table is considered optimized for preferred uses. Here, column 1 contains a record number, column 2 contains a cross-reference to the level 3 item hierarchy of the table in FIG. 5I, columns 3, 4 and 5 contain cross-references to the three geographic classification levels, column 6 contains a record entry or last update date, column 7 contains a cross-reference to the branch record number of the table in FIG. 5F, and columns 8 through 25 contain cross-references to the tables in FIGS. 5B and 5D for (up to) eight parameter-value pairs. Other data may be stored as well. Examples include sunset dates upon which records will be deleted, additional usage statistics for individual records, and so forth.

There will presumably be hundreds of thousands, or even millions of records in a table such as that depicted in FIG. 5J. For operational efficiency, one might therefore split up the table into smaller tables that handle subsets, and a particularly preferred breakdown is according to level 3 items record numbers. Thus, all records with level 3 item record numbers corresponding to each major item classification may advantageously be placed in a different logical database, or even a different physical database.

FIG. 5K contains a table that stores frequency information. In the preferred embodiment being described, column 1 contains a record identifier, column 2 contains a cross-reference to the level 3 item hierarchy of the table in FIG. 5I, column 3 contains a cross-reference to a parameter in the table in FIG. 5B, column 4 contains a cross-reference to a value in the table in FIG. 5D, and column 5 contains frequency information. The frequency information would presumably be updated on an on-going basis, effectively storing the number of "hits" for each item/parameter/value combination. In addition, there will advantageously be an additional record for each item/parameter pair, collecting frequency information for all values for that item and parameter.

Of course, many different database structures could be utilized to accomplish the self-evolving goals set forth herein, and the appended claims are not to be limited to the particular database structures set forth herein as examples. Among other things, it may be more efficient for some of the tables to have considerably fewer fields. Thus, the multiple parameter-value pair columns of the table of FIG. 5J may advantageously be replaced by a single pair of parameter-value columns (not shown). Similarly, the first five columns of table 5J may advantageously be replaced with a single listing identifier (not shown), that would tie together multiple parameter-value pairs, as well as key into other tables providing vendor, date, and other information.

Operation of a system using tables of FIGS. 5A–5K should be readily apparent to those skilled in the art. For example, for a user seeking information as opposed to a user adding information to the system, a typical scenario may be as follows. After the user has chosen an item classification, and perhaps a geographical classification, the system scans through the Main Frequency table as in FIG. 5K, selecting records corresponding to that item classification. The system then displays the corresponding parameters that can be selected for the first of eight parameter choices, along with corresponding frequency information as discussed above with respect to FIG. 2. If the user chooses to limit the number of records according to a value or value range for that parameter, then the system will display the corresponding values along with respective frequency information for each value displayed. The same applies to up to seven additional parameter choices or parameter/value pair choices employed by the user. Once the parameter choices and parameter/value pair choices have been entered, the system searches through Main Data Table as in FIG. 5J for records that match the parameters and values chosen by the user, and displays the corresponding records, if any. The user can then further modify the search, such as by sorting the results or altering the search parameters, or jump to a more detailed display screen (not shown) to display vendor or other additional information on a particular record.

Adding information to the system is contemplated to be accomplished in a manner analogous to that described herein for retrieving information. Tables very similar to those of FIGS. 2 and 3 may be used for that purpose, although where many parameter-value pairs are being entered for a given item, it may be advantageous to use a two column table (not shown) where each row corresponds to a single parameter value pair. In any event, users adding information will still preferably be guided in their choices for one or more of item characterization, parameter, and value selection by some sort of summary comparison information reflecting prior usage. The number of parameter value pairs that a given user can utilize for a given item will most likely be limited, perhaps somewhere between 12 and 35 pairs. In some instances users will likely choose all different parameters, and in other instances users will likely choose to enter multiple values for some of the same parameters. When listing an employment want ad, for example, a hiring company may want to use the parameter "job requirements" several times to record various degree and work experience requirements. When multiple values are entered for a given parameter, the system may advantageously split the corresponding display cell horizontally into multiple sub-cells.

Non-Marketplace Information

Viewed from a very high level of abstraction, the self-evolving database concept discussed above can be viewed as a bottom-up approach to database usage, as opposed to the traditional top-down approach employed by the prior Internet search engines and the known databases. In the bottom-up approach, each of the thousands or millions end-users of the system collectively define the categories, parameters and values, based upon feedback of what other end-users are doing. This contrasts with the top-down approach, in which a single entity, (such as a search engine provider, or perhaps a proprietary database manager), establishes for the end-users what the categories and parameters will be.

This is already done to an extremely rudimentary extent in chat rooms and bulletin boards, where anyone can post almost anything he or she wants to say. But such systems are almost impossible to access in a meaningful way if there are more than a few dozen postings. For example, it is entirely possible that a given bulletin board may have a few thousand comments on a given topic, and to fully access that amount information one would need to spend hundreds of hours reading the many comment. To even partially access the information one needs to read a sampling of the comments, perhaps 50 or 100 comments. Unfortunately, with such a sampling a user might well miss the unique comment in ten thousand which is of particular interest.

Feedback is also awkward at best, because someone adding information to the system does so in a manner that is difficult to connect with conceptually related information. To overcome this problem many of the "chat rooms" incorporate "threads", by which a user can follow through the various comments and responses to those comments posted about a given topic. Here again, however, the system works well only when there are only a handful of postings. When there are thousands, or even hundreds of postings to a given thread, the concept becomes unmanageable.

Somewhat analogously, it is also contemplated that there is a need to store and retrieve opinions using a bottom-up approach. Presently, opinions are stored and retrieved using either chat rooms and bulletin boards as discussed above, or in fixed question, top-down surveys. All of the same problems discussed above with respect to news items apply to opinions as well.

The presently described systems and methods address these problems very effectively, in part because the self-evolving concept can be used to store all manner of non-marketplace information, including news items, historical facts, book reviews, questionnaires, opinion surveys, case law, and the topics discussed in various chat rooms.

In FIG. 6, for example, a user entered the word "polymers" in a data entry field, and the system provided a listing of all classifications including "polymers". In the fifth column the system presents frequency information that assists the user in choosing among the various classifications. Some of these classifications may deal with offers to buy or sell polymers, but some of the classifications may also deal with miscellaneous information, including scientific articles, historical facts, and so forth. As with the marketplace indices described herein, the index itself is self evolving. Anyone can enter any classification he or she chooses, and the classifications most commonly used will bubble to the top of the listing.

FIG. 7 is similar to FIG. 2. In this particular instance, however, the user chose to include "Type of Company" in the second column, "Company Involved" in the third column, and so forth. Again, as with the marketplace indices described herein, the first row of each column can be used as a drop-down window to select parameters, and the user is guided in his or her selection by information relating to usage of these parameters by previous users. Of course, in a real world example the user would very likely select from parameters different from those shown here, and may well have several dozen parameters to choose from.

FIG. 8 is a sample of a display screen similar to FIG. 7. In this instance, however, the user chose a different classification, namely Sports/Olympics/Drug Use. Also, the user limited the items listed to those items in which the Type of Story was entered as medical, and the date was after Feb. 2, 1999.

It is contemplated that systems and methods described herein can store and retrieve opinions in a manner substantially similar to that described herein for marketplace information, news items, and other miscellaneous information. In FIG. 9, for example, a user entered the name, Clinton, and was presented with a listing of classifications relating to people's opinions regarding Clinton. In this particular instance, the user checked off the third row of data, relating to Hillary Clinton's run for a senate office seat.

In FIG. 10, the user has chosen to list questions according to frequency. No limitation (in row 2) as to the value of the frequency was selected, so that even questions that garnered minimal interest are included. Other columns selected listed the number of "yes" responses, the number of "no" responses, the total number of responses, dollar amount, and average dollar amount. Examples of other columns that were not selected are standard deviation, and other statistical functions. In addition, a user could have a text column, which might seek adjectives to describe a particular venture. In data row 3, for example, a question was listed that asks for an adjective. The user chose the fourth column to list adjectives, and in the pull down of the values (not shown) may have received a listing of what adjectives were used by what percentage of respondents. Alternatively, the user could have entered a particular adjective as a value designation in the second row, and then chosen the other columns to obtain data with respect to respondents choosing that adjective. More complex tables can also be provided that statistically analyze specific responses to a given question. It is especially contemplated that the system can keep track of identifiers for individual users, so that their opinions about literally hundreds of various things can be accumulated over the years.

In still another example of the flexibility of the systems and methods discussed herein, the self-evolving database concept can be utilized to provide an index to case law. The LEXIS™ system, for example, does not presently have a sophisticated key indexing system such as that found on the Westlaw™ system. On the other hand, a given user may well find that the Westlaw™ key system does not characterize the cases in a manner especially useful to that particular user. Under the presently contemplated self-evolving database concept, users could categorize cases in any manner that they choose, and then record their own summaries or other interpretations of cases of interest to them using parameter-value pairs. LEXIS™ or Westlaw™ could keep track of such categorizations and parameter-value pairs as a service for the users, but then also make available to all users the categorizations and parameter-value pairs used by others. In that manner categorizations and summaries of cases in each particular field and subfield would eventually evolve to reflect what the users have stored for their own benefit. This would allow LEXIS™ to develop its own key-type system without doing much of anything, and would allow Westlaw™ to improve its own key system.

In short, it should be apparent from the above discussion that systems and methods employing the self-evolving database concept is a significant improvement over all previously known database systems, and especially over previously known publicly modifiable, and wide access database systems. It allows users to quickly and efficiently access hundreds of thousands or even millions of records, and still find only those few records that are relevant. Even more importantly, the system allows users to add data and search for items according to parameters and values in a manner that allows the entire database to evolve.

Thus, systems and methods relating to self-evolving databases have been described herein. While specific embodiments and applications of this invention have been shown and described, it would be apparent to those skilled in the art that many more modifications are possible without departing from the inventive concepts herein. Among other things, for example, the concepts discussed herein can be employed in narrow access databases, such as those directed to employees or customers of a single company. The invention, therefore, is not to be restricted except in the spirit of the appended claims.

What is claimed is:

1. A method of storing marketplace information for multiple types of items in a database having a structure, comprising:

providing a user with a parameter list relating to at least a portion of the multiple types of items;

providing a first data entry interface that allows the user to add an additional parameter to the parameter list without modifying the structure of the database; and providing a second data entry interface that allows the user to use the additional parameter to record additional data relating to the item.

2. The method of claim 1 further comprising:

providing the user with an item list;

providing a third data entry interface that allows the user to select the item from the item list.

3. The method of claim 1 further comprising:

displaying parameter usage information to the user for use in selecting the subset of parameters.

4. The method of claim 1 further comprising:

displaying value usage information to the user for assist in selecting a value to be used in conjunction with a particular parameter of the subset of parameters.

5. The method of claim 1 further comprising:

providing the user with a hierarchical access to the item list.

6. The method of claim 1 further comprising:

providing the user with an item list;

providing a data entry interface that allows the user to select the item from the item list; and displaying parameter usage information to the user for use in selecting the subset of parameters.

7. The method of claim 6 further comprising:

providing the user with a hierarchical access to the item list.

8. The method of claim 6 further comprising:

displaying value usage information to the user for assist in selecting a value to be used in conjunction with a particular parameter of the subset of parameters.

9. A self-evolving database system having a predefined structure, comprising:

a data structure that stores goods and services as combinations of item classifications, parameters, and values, wherein at least some of the classifications, parameters, or values used to describe different items vary over time, where end users can add additional parameters without modifying the predefined structure of the database; and at least one data interface that guides the end users in their choices of the combinations by displaying summary comparison usage information derived from the choices of previous users.

10. The self-evolving database system of claim 9 further comprising a data interface that allows the end users themselves to add at least one of new classifications, new parameters, and new values, which can then be list selected by subsequent users in describing their own items.

11. The self-evolving database system of claim 9 further comprising a data interface that allows the end users themselves to add some combination of new classifications, new parameters, and new values, which can then be list selected by subsequent users in describing their own items.

12. The self-evolving database system of claim 9 further comprising a data interface that allows the end users themselves to add new classifications, new parameters, and new values, which can then be list selected by subsequent users in describing their own items.

* * * * *